May 13, 1952     P. J. GOAD     2,596,896
FISHING LEADER HOLDER
Filed June 11, 1948
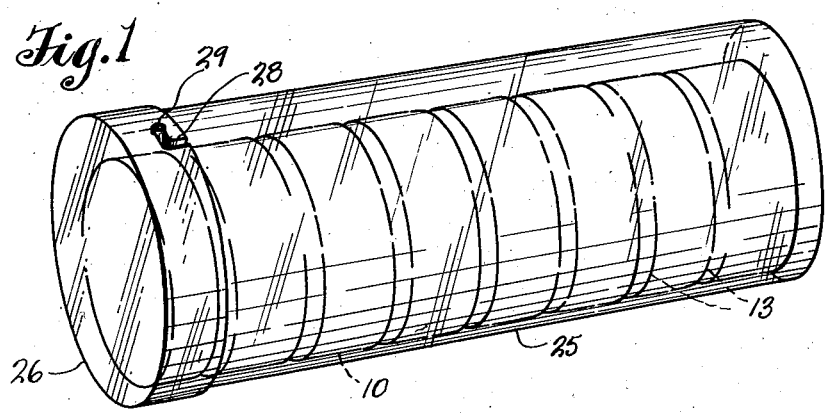
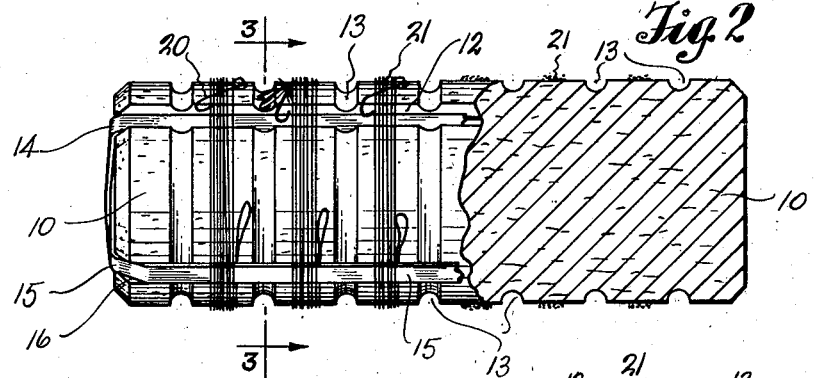
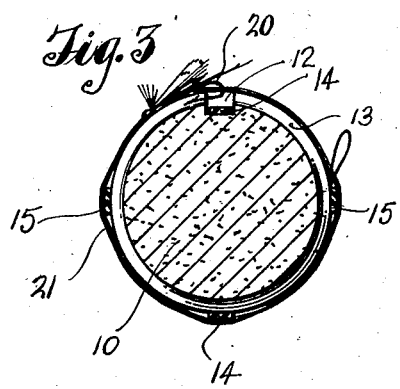
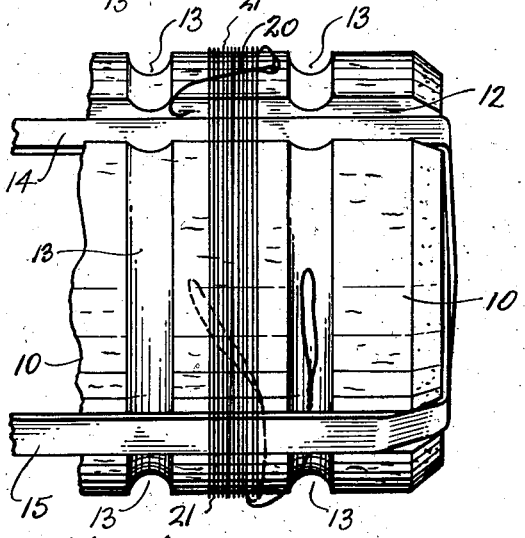
Inventor
PERCY J. GOAD
By
Cook & Robinson
Attorney Patented May 13, 1952

2,596,896

UNITED STATES PATENT OFFICE 2,596,896

FISHING LEADER HOLDER

Percy J. Goad, Richmond Beach, Wash.

Application June 11, 1948, Serial No. 32,430

3 Claims. (Cl. 43—57.5)

1

This invention relates to improvements in holders for fish line leaders of those kinds designed to have the leaders wrapped thereabout and secured; it being the principal object of my invention to provide a holder for leaders and flies comprising a light-weight, preferably round piece of wood, or a like moisture-retaining material, about which the leaders that are to be held may be individually wound in orderly, spaced relationship and secured for easy release, thus to provide for their easy inspection, selection and removal without opportunity of any one of the leaders becoming entangled with another.

It is also an object of the invention to provide a holder that may be moistened and which will retain moisture therein for a considerable period of time to insure that the leaders wound thereon will be kept moist, pliable and in best condition for use.

It is a further object of the invention to provide a holder for leaders and flies which will insure against hooks or flies becoming damaged while applied to the holder.

Yet another object of the invention is to provide a combination of holder and a case therefor, which latter is of an air sealed material, that retards dissipation of moisture from the holder and which also is transparent to give ready view to all leaders for inspection without necessitating opening the case.

Still another object of my invention is to provide a holder comprising a block of material, preferably round in cross-section and of balsa wood, or an equivalent material, that is light in weight, durable in use and quickly absorptive of moisture, and with which holder rubber bands are associated in a novel manner that provides for the quick and easy securing thereby of the ends of leaders as wound on the holder, also, providing for an easy release and quick removal of any leader without causing loosening or releasing any other, as wound on the holder.

Further objects of my invention reside in the details of construction and combination of parts, and in the mode of use of the device as will hereinafter be fully described.

In accomplishing these and other objects of the invention, I have provided the improved details of construction, the preferred forms of which are illustrated in the accompanying drawings, wherein:

Fig. 1 is a perspective view of a fishing leader and fly holder embodied by the present invention, as applied within its transparent case.

Fig. 2 is a perspective view of the holder, apart from the case, and showing the manner of winding and securing the leaders thereon, a part of the holder being in section for better understanding of details.

Fig. 3 is a cross-sectional view of the holder, showing the manner of winding a leader thereon.

Fig. 4 is a view illustrating the manner of securing the end portion of a leader after winding the leader about the holder.

Referring more in detail to the drawings:

The present holder, designated in its entirety by reference numeral 10, comprises a piece of soft, light-weight, water-absorbent material, preferably a piece of balsa wood or a wood having similar characteristics. For convenient use, this piece of wood should be approximately one and one-half to two inches in diameter and about four to six inches long. However, the dimensions may vary to meet requirements or desires without departing from the mode of use.

Formed lengthwise of the holder in the surface portion thereof and extending from end to end, is a square-cut channel 12. This should be approximately one-half to three-eighths of an inch wide and about one-fourth inch deep. Also, formed in the surface portion of the holder, at regularly spaced intervals therealong, are encircling channels 13 of semi-circular cross-section as shown best in Fig. 2. These channels preferably are about one-half inch apart and about one-fourth inch across.

Applied tightly about the holder, lengthwise thereof, are two rubber bands 14 and 15. These are held under tension tightly across the end surfaces of the holder, and are retained in the desired relationship by seating the bands in notches, as at 16, formed on the edge portions of the holder. The first band is applied within and extends along the base of channel 12, across the ends of the holder and along its surface directly opposite the channel 12. The other band is applied about the holder in a plane that is at a right angle to the plane of the first, so that parts of the bands extend under tension to the full length of the holder at intervals of 90° spacing thereabout.

To apply the leaders, with hooks and flies attached, to the holder, they are individually wound thereon first by engaging the point of the hook 20 with a side wall of the channel 12, then winding the leader 21 tightly about the holder on the flat surface portion between two adjacent channels 13, and finally securing the end of the leader by projecting the end portion thereof beneath a longitudinal length of rubber band, as shown in Fig. 4, at a point where the band crosses one of the channels 13 between which the leader is applied, then pulling the end portion laterally beneath the band as to the dotted line showing of this part in Fig. 4, thus to cause the said end to be gripped and held beneath the band, as will be understood.

All leaders are likewise applied, and the fact that they are wound over the rubber bands, insures that the latter will be held close to the surface of the holder and the ends of the leaders will be held secure thereby.

The fact that the leaders are wound on the flat surfaces between the encircling channels makes them easily visible and leaves the channels 13 open for easy threading of the ends of the leaders beneath the strips of rubber.

After leaders have been wound and secured, it is desirable that the holder be immersed in water for a short period of time so that it will absorb moisture that will be dissipated therefrom over a long period of time to keep the leaders moist and in best condition for use.

To insure best use of the holder, it should be carried within a case that will resist the drying out of moisture in the holder body. In the present instance, I provide a tubular case 25 of transparent plastic. This case is sufficiently greater in diameter than the holder as to permit easy application of the latter without damage to leaders or flies that are mounted thereon. The case is closed at one end and is equipped at its other end with an outside slip fit cover 26. The cover flange is formed at one side with a bayonet slot 28, and the case has a lug 29 thereon designed to enter the slot to hold the cover in place, yet permitting easy removal.

The present device affords a convenient holder for leaders, to which said leaders may be easily and readily applied and secured. Also, it provides for ready inspection or selection of a leader, and its easy removal without disturbing any other, merely by releasing its end from beneath the holding rubber band and then unwinding it from the holder.

The balsa wood body retains moisture for a long period and this operates to keep the leaders moist and in proper condition for use. The device, even with case, is extremely light and can be carried conveniently and easily in the pocket.

Rubber strips may be applied in other ways than shown. For example, single strands might be drawn lengthwise of the body and secured at their ends by wrappings or other means. Therefore, it is not intended that the device be restricted to use of rubber bands as illustrated.

Having thus described my invention, what I claim as new therein and desire to secure by Letters Patent is:

1. A holder for a plurality of fish line leaders comprising an elongated body of wood, round in cross-section, formed at spaced intervals therealong with encircling channels defining wrapping surfaces between them about which the leaders may be individually wrapped and secured, said body being formed with a longitudinal channel from end to end providing side wall surfaces with which the fish hooks on the ends of said leaders may be engaged to hold those ends of the leaders for wrapping, and rubber bands applied under tension about the said body lengthwise thereof and in spaced relationship, said body having notches at its ends seating said bands therein to retain their spacing.

2. A leader holder comprising an elongated body of wood, formed at spaced intervals therealong with encircling channels defining surfaces between them about which the leaders to be held may be wrapped, and there being a channel formed in and across each of the wrapping surfaces, presenting side wall surfaces with which the fish hooks attached to the outer ends of said leaders may be holdingly engaged, for the wrapping of the leader about the body, and a rubber band applied under tension longitudinally of the body of wood, across the encircling channels therein and over which band the leaders may be wrapped and beneath which their inner ends may be drawn and releasably held.

3. A holder for fish line leaders comprising an elongated body of water absorbent wood, with encircling channels formed therein in spaced relationship defining leader wrapping surfaces between them on which the leaders to be held may be individually wrapped, and having a longitudinal channel formed therein through the said wrapping surfaces and presenting wall surfaces with which points of the hooks on the leaders may be holdingly engaged for the wrapping of the leaders about the body, and a rubber band secured under tension lengthwise of the body across said encircling channels and the wrapping surfaces and secured at the ends of the body and over which band the leaders may be wrapped and beneath which ends thereof may be secured upon projecting the said ends within adjacent encircling channels beneath the band and then drawing them laterally from the channels and between the band and wrapping surfaces.

PERCY J. GOAD.

REFERENCES CITED

The following references are of record in the file of this patent:

UNITED STATES PATENTS

| Number | Name | Date |
| --- | --- | --- |
| 290,154 | Vidal | Dec. 11, 1883 |
| 566,595 | Magnuson | Aug. 25, 1896 |
| 595,664 | Wenger | Dec. 14, 1897 |
| 855,063 | Koenig | May 28, 1907 |
| 952,314 | Ellsworth | Mar. 15, 1910 |
| 1,416,142 | Trumble | May 16, 1922 |
| 1,932,353 | Pflueger | Oct. 24, 1933 |
| 1,986,441 | Koepke | Jan. 1, 1935 |
| 2,125,856 | De Witt | Aug. 2, 1938 |
| 2,431,821 | Murph | Dec. 2, 1947 |